United States Patent [19]

Cand et al.

[11] Patent Number: 4,771,915

[45] Date of Patent: Sep. 20, 1988

[54] FOOD APPARATUS

[75] Inventors: Jean-Pierre Cand, Yverdon; Ernst Heck, Echandens, both of Switzerland

[73] Assignee: Nestec S.A., Vevey, Switzerland

[21] Appl. No.: 116,522

[22] Filed: Nov. 3, 1987

[30] Foreign Application Priority Data

Dec. 9, 1986 [CH] Switzerland .......................... 4905/86

[51] Int. Cl.⁴ .......................... B29C 31/06; B65B 3/08; B65B 3/26; A21C 5/08
[52] U.S. Cl. ........................................ 222/56; 222/57; 425/135; 425/204; 425/238
[58] Field of Search .............................. 222/55, 56–57, 222/271; 198/532, 533, 550.1, 550.6, 625, 676; 425/135, 145, 204, 238

[56] References Cited

U.S. PATENT DOCUMENTS

| 2,536,240 | 1/1951 | Vincent | 198/676 |
| 2,536,345 | 1/1951 | Bradford | 198/676 |
| 3,245,584 | 4/1966 | Linville | 222/57 |
| 3,756,372 | 9/1973 | Mertens | 198/550.1 |

*Primary Examiner*—Willard Hoag
*Attorney, Agent, or Firm*—Vogt & O'Donnell

[57] ABSTRACT

An apparatus for distributing and metering a granular and sticky mass, in particular a mass to be moulded into biscuits. The apparatus comprises a main conveyor device comprising juxtaposed parallel screws of alternate pitch and direction of rotation, which are subdivided into groups of at least one pair of screws, a main motor and main transmission means comprising one clutch per group of screws, hoppers which are juxtaposed below the downstream end of the main conveyor device in a ratio of one hopper per group of screws and, beneath each hopper, a distribution column comprising an inlet, a holding chamber and an outlet, the said inlet being provided with a device for measuring the level of filling which is electronically connected to a control device for controlling the clutch of the said group of screws.

8 Claims, 3 Drawing Sheets

FOOD APPARATUS

The present invention relates to an apparatus for distributing and metering a granular and sticky mass, in particular a mass to be moulded into biscuits.

In the manufacture of biscuits composed, for example, of agglomerated granules of expanded cooked cereals coated with a binder based on sugar syrup, the handling of the mass of granules mixed with the binder gives rise to serious problems. In fact, such a mass, on the one hand, has a tendency to set in a block and, on the other hand, has an acute flow slope, in other words, it does not run. These manipulation problems make the biscuit moulding operation particularly difficult.

An apparatus for moulding a similar mass comprising a conveyor belt formed by juxtaposed plates each perforated with a row of holes in which the mass is introduced by a bottomless distributing bin in direct contact with the belt is known. The mass is held in the holes by a stationary supporting plate on which the belt slides. The mass is then compressed in the holes or cavities by a row of pistons. The moulded biscuits are then expelled by the same pistons downstream of the stationary support. Such an apparatus is suitable if the mass is sufficiently flowable. In fact, if the mass does not flow, all the force exerted on it is transmitted into the axis of the applied force. Consequently, the holes or cavities may be filled inhomogeneously as they pass beneath the bottomless bin and the pistons cannot then equalize the surface. Biscuits produced in this way from a non-flowable mass risk having excessive variations in unit weight and irregularities in shape.

The object of the present invention is to provide an apparatus for distributing and metering a granular and sticky mass which allows both accurate measurement and regular distribution of this mass, for example in the moulding cavities.

The apparatus according to the present invention is characterised in that it comprises a main conveyor device containing juxtaposed parallel screws of alternate pitch and alternate directions of rotation which are sub-divided into groups of at least one pair of screws, a main motor and main transmission means comprising one clutch per group of screws, hoppers juxtaposed below the downstream end of the main conveyor device in a ratio of one hopper per group of screws and, beneath each hopper, a distribution column comprising an inlet, a holding chamber and an outlet, the said inlet being provided with a device for measuring the level of filling which is connected to a device for controlling the clutch of the said group of screws.

This apparatus actually allows simultaneous distribution in the same line of several portions of identical shape and volume of an uncompacted granular and sticky mass and allows the operation to be repeated at a suitable frequency without a variation in the state of the distributed mass. In other words, this apparatus guarantees, at the same time, the regularity of the volume and shape of the portions, the homogeneity of the mass and reproducibility of these qualities, which is essential for continuous production.

The said main conveyor device allows, in particular, a granular and sticky mass to be moved in the form of a laminar stream having a wide front and small depth in which the mass is not subjected to compaction. This stream cannot deviate transversely owing to the alternate pitch and direction of rotation of the screws. Intermittent stoppage of the partial stream corresponding to one or other of the said groups of screws only has a slight influence on the movements of adjacent partial streams. The all or nothing control of these partial streams by means of clutches and devices for measuring the levels of filling in the columns has the surprising result that the mass always flows under the same conditions and at the same rate in all columns and that each of the said portions of the mass defined by the volume of the holding chamber is invariably in the same desirable noncompacted state.

In a preferred embodiment, this apparatus also comprises an auxiliary conveyor device containing juxtaposed parallel screws of alternate pitch and direction of rotation, an auxiliary motor and auxiliary transmission means. This auxiliary conveyor device may be used to form the granular and sticky mass into a laminar stream of wide front and small depth before it is poured onto the main conveyor device.

The conveyor devices are preferably produced in the form of rectangular frames which are open at the top and are closed at the bottom over the majority of their length by a flat or corrugated base, the downstream end remaining open. The screws are arranged longitudinally above the base and their ends are journalled in bearings provided in downstream and upstream transverse uprights of the frame. The screws may be hollow or solid. The screws of the main conveyor device are preferably hollow, in other words produced in the form of spirals in the manner of a helical spring and covered by polytetrafluoroethylene. On the other hand, the screws of the auxiliary conveyor device are preferably solid and produced from solid polytetrafluoroethylene.

The conveyor devices may be surmounted by stirrers comprising at least one transverse rotating rake produced, for example, in the form of a shaft bearing radial teeth at regular intervals. Such a stirrer may be useful for distributing the granular and sticky mass, in particular in the vicinity of the point where it is poured onto the main conveyor device. In a preferred embodiment of this apparatus, the auxiliary conveyor device is surmounted by a stirrer over the majority of its length.

The said main or auxiliary transmission means may take the form of gears and/or chains. Thus, the groups of screws in the main conveyor device can each be driven by means of a shaft connected via the said clutch, for example, an electromagnetic clutch, to a toothed wheel driven by a chain which is in turn driven by a toothed wheel fixed to the shaft of the said main motor. The various groups of screws are thus connected to one another by a gear composed of toothed wheels fixed at the ends of the screws which can project at the exterior of one of the said transverse downstream or upstream uprights. On the other hand, the said auxiliary transmission means can take the form of a single gear.

With regard to the distribution columns, each one comprises an inlet, a chamber and an outlet. Each inlet is provided with a device for measuring the level of filling which is connected to a device for controlling the clutch of the corresponding group of screws. These devices are designed to stop or start the said group of screws depending on whether the chamber is completely filled with granular and sticky mass or has just been emptied. The device for measuring the level of filling may comprise, for example an optical, pneumatic or capacitive sensor. It has been found that particularly satisfactory results can be obtained with a capacitive cell which gives an accurate quantitative measurement of the mass accumulated in front of it. In this case, the device for controlling the clutch may advantageously take the form of an electronic circuit which compares the signal transmitted by the capacitor with a reference value correponding to a limiting filling level in the inlet.

A central portion of each column is produced in the form of a chamber connected to the inlet and outlet means of an upper closure member and a lower closure member which define or meter the volume of the portions of mass to be distributed. The wall of the column extending between the two closure members preferably takes the form of two telescopic cylinders which allow the height of the chamber and consequently the volume of the portions to be adjusted to a desired value. The closure members are connected to a driving and control device designed to effect and synchronise the opening and closing thereof as a function, for example, of the movement of the moulds or cavities just positioned beneath the distribution columns.

Each of the said column outlets may simply consist of an extension of the chamber, for example, in the form of a cylinder of suitable diameter corresponding, for example, to the diameter of the moulds or cavities to be filled. In a variation, the said column outlets each contain a distribution cone which is arranged axially and which widens towards the bottom. These distribution cones are designed to improve further the regularity of the shape of the distributed portions of mass and, in particular, the smoothness of their surface. In a further variation, each of the said column outlets has a first inclined portion opening into a second vertical portion in the axis of which there is arranged a rotating shaft having a set of inclined radial fins at its lower end and which is connected to a piston and to a driving means by its upper end. These sets of rotating fins are designed to improve further the smoothness of the surface of the portions of mass after the portions of mass have been distributed, for example in the moulds or cavities. In this embodiment, the movements of the said pistons are synchronized with the movements of the said lower closure members.

The apparatus according to the present invention is described below with reference to the drawings.

Figure 1:
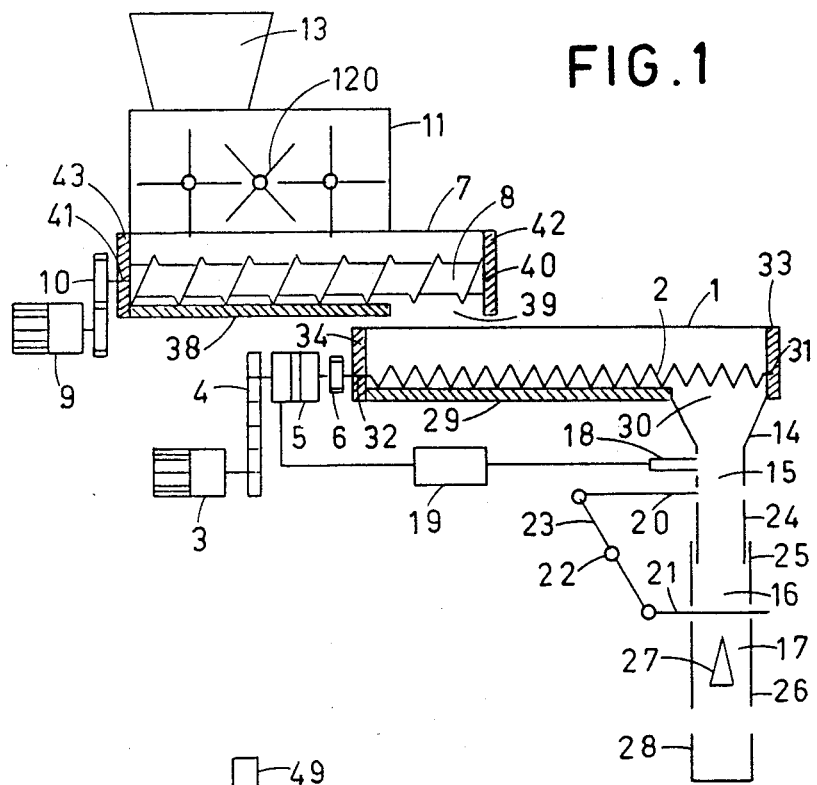
FIG. 1 shows a schematic side view in partial cross-section of an embodiment of the present apparatus.
Figure 2:
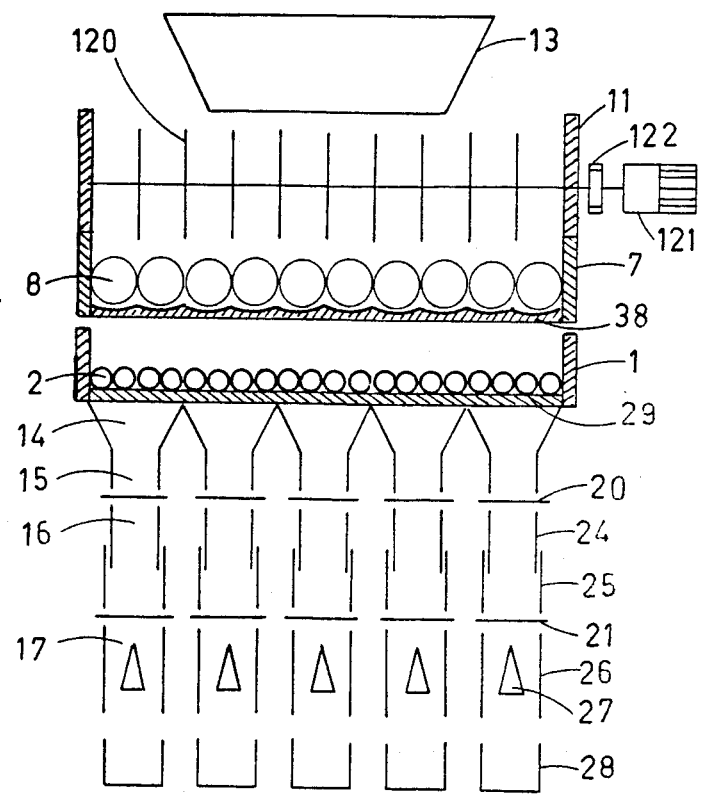
FIG. 2 shows a schematic front view in partial cross-section of the same embodiment of the present apparatus.

In the embodiment shown in FIGS. 1 and 2 the apparatus comprises a main conveyor device 1 comprising twenty parallel juxtaposed screws 2 of alternate pitch and direction of rotation which are subdivided into groups of two pairs of screws, a main motor 3 and main transmission means comprising a chain 4 as well as an electromagnetic clutch 5 and one gear 6 per group of screws.

The apparatus also comprises, upstream of the main conveyor device 1, an auxiliary conveyor device 7 comprising ten juxtaposed parallel screws 8 of alternate pitch and direction of rotation, an auxiliary motor 9 and auxiliary transmission means consisting of a gear 10. Above the auxiliary conveyor device 8 there is arranged a stirrer 11 comprising three transverse rotating rakes 120 each formed by a shaft bearing crowns of four radial teeth at regular intervals. These rakes 120 are driven by a motor 121 by means of a gear 122. A hopper 13 for supplying the apparatus with the granular and sticky mass is arranged above the stirrer 11.

Hoppers 14 are juxtaposed beneath the downstream end of the main conveyor device in a ratio of one hopper per group of screws. A distribution column comprising an inlet 15, a chamber 16 and an outlet 17 is arranged beneath each hopper 14. Each distribution column inlet 15 is provided with a device for measuring the level of filling comprising a capacitive cell 18 connected to a control device 19 for controlling the electromagnetic clutch 5. This control device 19 is produced in the form of an electronic comparison circuit which compares the signal transmitted by the capacitive cell with a reference value corresponding to a limiting filling level in the inlet. Once the signal from the capacitive cell reaches the reference value, the comparison circuit transmits a control signal to disengage the electromagnetic clutch. Once the signal from the capacitive cell falls below the reference value, the comparison circuit transmits a control signal to engage the electromagnetic clutch.

Each chamber 16 comprises an upper closure member 20 and a lower closure member 21 which, in this case, take the form of slide bars. These closure members are connected to a driving and control device comprising, in this case, a shaft 22 which actuates an oscillating arm 23 and is connected to driving means (not shown). This device is designed to open and close the closure members as a function of the movement of the moulds or cavities 28 which are positioned beneath the outlet 17 of the distribution columns. The wall of the column contained between the two blocking members is produced in the form of two telescopic cylinders 24, 25.

Each of the said column outlets consists of an extension of the chamber in the form of a cylinder 26 having a diameter corresponding to the diameter of the moulds or cavities 28 to be filled. Each outlet contains one distribution cone 27 which is arranged axially and which widens towards the bottom.

Figure 3:
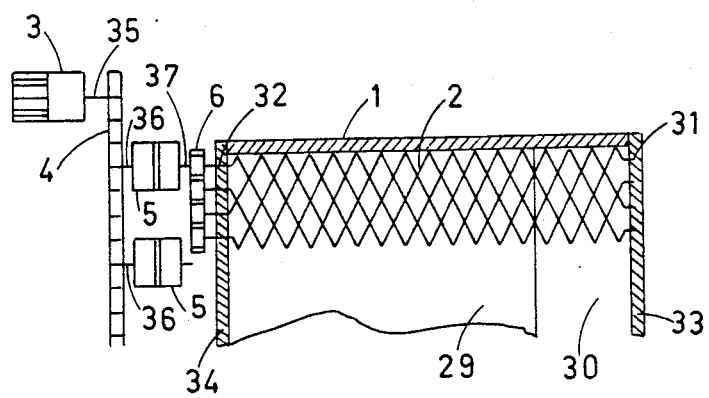
FIG. 3 shows a partial schematic view from above of the main conveyor device according to FIGS. 1 and 2.

As shown in FIGS. 1, 2 and 3, the screws 2 of the main conveyor device 1 are hollow, in other words they are in the form of helical spirals. They are covered with polytetrafluoroethylene. The main conveyor device 1 takes the form of a rectangular frame which is open at the top and closed at the bottom over the majority of its length by a flat base 29, the downstream end 30 remaining open. The screws 2 are arranged longitudinally above the base 29 and their ends 31, 32 are set in bearings provided in the downstream transverse uprights 33 and upstream transverse uprights 34 of the frame. The main motor 3 drives the chain 4 by means of a toothed wheel fixed to its shaft 35. The chain drives the toothed wheels fixed to the upstream shafts 36 of the clutches 5. The downstream shaft 37 of each clutch drives the gear 6 formed from toothed wheels fixed at the ends 32 of the screws which project at the exterior of the upstream transverse upright 34.

Figure 4:
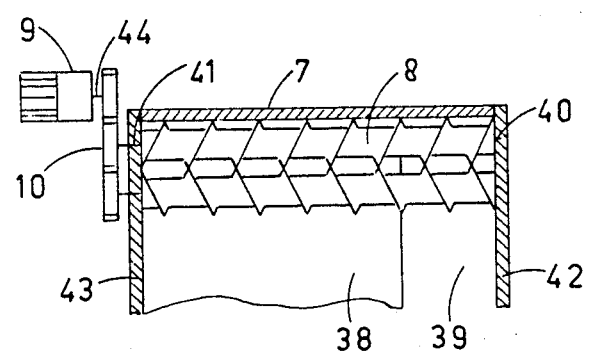
FIG. 4 shows a partial schematic view from above of the auxiliary conveyor device according to FIGS. 1 and 2.

As shown in FIGS. 1, 2 and 4, the screws 8 of the auxiliary conveyor device 7 are solid. They are produced entirely from polytetrafluoroethylene. The auxiliary conveyor device 7 is also produced in the form of a rectangular frame which is open at the top and closed at the bottom over the majority of its length by a corrugated base 38, the downstream end 39 remaining open. The screws 8 are arranged longitudinally above the base 38 and their ends 40, 41 are set in bearings provided in the downstream transverse uprights 42 and upstream transverse uprights 43 of the frame. The screws 8 are driven by the auxiliary motor 9 by means of a single gear 10 formed by a toothed wheel fixed at the ends 41 of the screws which project to the exterior of the upstream transverse upright 43.

Figure 5:
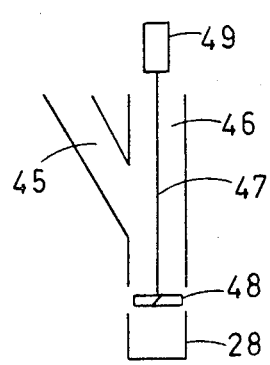
FIG. 5 shows a schematic side view in cross-section of a modification of the outlet of the distribution columns.

The modification of the distribution column outlet shown in FIG. 5 has a first inclined portion 45 which is positioned beneath the lower closure member 21 of the chamber (see FIGS. 1 and 2) and which opens into a second vertical portion 46. In the axis of this vertical portion 46 there is arranged a rotating rod 47 which has a set of inclined radial fins 48 at its lower end which is connected by its upper end to a piston 49 combined with a pneumatic driving means. The set of rotating fins 48 can drop under the influence of the movement of the piston so as to equalize the surface of the portion of granular and sticky material poured into the mould or cavity 28. The movements of the piston 49 are synchronized with the movements of the lower closure member 21 of the holding chamber.

We claim:

1. An apparatus for distributing and metering a granular and sticky mass, in particular a mass to be moulded into biscuits, which comprises a main conveyor device comprising juxtaposed parallel screws of alternate pitch and direction of rotation, which are sub-divided into groups of at least one pair of screws, a main motor and main transmission means comprising one clutch per group of screws, hoppers which are juxtaposed beneath the downstream end of the main conveyor device in a ratio of one hopper per group of screws and, beneath each hopper, a distribution column comprising an inlet, a holding chamber and an outlet, the said inlet being provided with a device for measuring the level of filling which is connected electronically to a control device for controlling the clutch of the said group of screws.

2. An apparatus according to claim 1, which also comprises an auxiliary conveyor device comprising juxtaposed parallel screws of alternate pitch and direction of rotation, an auxiliary motor and auxiliary transmission means.

3. An apparatus according to claim 1, wherein the screws of the main conveyor device are hollow and are covered with polytetrafluoroethylene.

4. An apparatus according to claim 2, wherein the screws of the auxiliary conveyor device are solid and are composed of polytetrafluoroethylene.

5. An apparatus according to claim 2, wherein the auxiliary conveyor device is surmounted by a stirrer comprising at least one transverse rotating rake.

6. An apparatus according to claim 1, wherein each of the said devices for measuring the level of filling comprises a capacitive cell.

7. An apparatus according to claim 1, wherein each of the said column outlets contains a distribution cone arranged axially and which widens towards the bottom.

8. An apparatus according to claim 1, wherein each of the said column outlets has a first inclined portion opening into a second vertical portion in the axis of which there is arranged a rotating shaft which has a set of inclined radial fins at its lower end and is connected to a piston and to a driving means by its upper end.

* * * * *

UNITED STATES PATENT AND TRADEMARK OFFICE
CERTIFICATE OF CORRECTION

PATENT NO. : 4,771,915

DATED : September 20, 1988

INVENTOR(S) : Jean-Pierre Cand, et al.

It is certified that error appears in the above-identified patent and that said Letters Patent is hereby corrected as shown below:

Column 1, line 1, under the heading "FOOD APPARATUS", insert --BACKGROUND OF THE INVENTION--.

Column 1, between lines 33 and 34, insert --SUMMARY OF THE INVENTION--.

Column 2, between lines 19 and 20, insert --DESCRIPTION OF PREFERRED EMBODIMENTS--.

Column 2, line 65, after "example" insert a comma.

Column 3, line 5, "correponding" should be --corresponding--.

Column 3, between lines 43 and 44, insert --BRIEF DESCRIPTION OF THE DRAWINGS--.

Column 3, between lines 56 and 57, insert --DETAILED DESCRIPTION OF THE DRAWINGS--.

Signed and Sealed this

Twenty-first Day of March, 1989

Attest:

DONALD J. QUIGG

Attesting Officer

Commissioner of Patents and Trademarks